(12) United States Patent
Nesbitt et al.

(10) Patent No.: US 11,807,052 B2
(45) Date of Patent: Nov. 7, 2023

(54) TIRE TREAD WITH A BAND LAYER

(71) Applicant: Bridgestone Americas Tire Operations, LLC, Nashville, TN (US)

(72) Inventors: Adam K Nesbitt, Akron, OH (US); Jared J. Griebel, Orange Village, OH (US); Brandon P. Nelson, Stow, OH (US); Benjamin E. Rimai, Copley, OH (US); Bradley S. Plotner, Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 204 days.

(21) Appl. No.: 17/417,884

(22) PCT Filed: Jan. 3, 2020

(86) PCT No.: PCT/US2020/012150
§ 371 (c)(1),
(2) Date: Jun. 24, 2021

(87) PCT Pub. No.: WO2020/142665
PCT Pub. Date: Jul. 9, 2020

(65) Prior Publication Data
US 2022/0072906 A1 Mar. 10, 2022

Related U.S. Application Data

(60) Provisional application No. 62/788,681, filed on Jan. 4, 2019.

(51) Int. Cl.
*B60C 7/10* (2006.01)
*B29D 30/02* (2006.01)
(Continued)

(52) U.S. Cl.
CPC .............. *B60C 7/102* (2013.01); *B29D 30/02* (2013.01); *B29D 30/58* (2013.01); *B60C 7/22* (2013.01); *B60C 7/146* (2021.08)

(58) Field of Classification Search
CPC ........... B60C 7/102; B60C 7/22; B60C 7/146; B29D 30/02; B29D 30/58; B21D 22/16
See application file for complete search history.

(56) References Cited

U.S. PATENT DOCUMENTS

| | | | | |
|---|---|---|---|---|
| 648,929 A | * | 5/1900 | Deming ................. | B21D 22/16 72/115 |
| 1,450,699 A | * | 4/1923 | Morse et al. ............ | C21D 8/10 148/593 |

(Continued)

FOREIGN PATENT DOCUMENTS

| | | | | |
|---|---|---|---|---|
| CN | 102887036 | | 1/2013 | |
| EP | 3000619 A1 | * | 3/2016 | ............. B29D 30/02 |

(Continued)

OTHER PUBLICATIONS

International Search Report and Written Opinion; Corresponding PCT Application No. PCT/US2020/012150; Authorized Officer Chan Yoon Hwang; dated Apr. 28, 2020.

(Continued)

*Primary Examiner* — Kip T Kotter
(74) *Attorney, Agent, or Firm* — Shaun J. Fox; Bryan J. Jaketic

(57) ABSTRACT

A non-pneumatic tire includes an inner ring having an axis of rotation and an outer ring coaxial with the inner ring. The non-pneumatic tire further includes support structure extending from the inner ring to the outer ring and a circumferential tread extending about the outer ring. The (Continued)

circumferential tread includes a band layer constructed of a single material and a tread rubber layer directly attached to the band layer.

19 Claims, 8 Drawing Sheets

(51) Int. Cl.
*B29D 30/58* (2006.01)
*B60C 7/22* (2006.01)
*B60C 7/14* (2006.01)

(56) References Cited

U.S. PATENT DOCUMENTS

| | | | | |
|---|---|---|---|---|
| 6,012,313 | A * | 1/2000 | Persico | B21B 21/045 |
| | | | | 72/10.4 |
| 6,142,203 | A * | 11/2000 | Bickford | B60C 7/22 |
| | | | | 152/394 |
| 6,354,349 | B1 | 3/2002 | Vannan et al. | |
| 2004/0045652 | A1 * | 3/2004 | Vanneste | B60C 9/0007 |
| | | | | 57/902 |
| 2015/0122385 | A1 | 5/2015 | Cron et al. | |
| 2017/0057288 | A1 | 3/2017 | Sugiya et al. | |
| 2017/0120681 | A1 | 5/2017 | Toyosawa | |
| 2017/0129285 | A1 * | 5/2017 | Toyosawa | B60C 7/00 |
| 2018/0029419 | A1 * | 2/2018 | Kim | B60C 7/12 |
| 2018/0086142 | A1 | 3/2018 | Hasegawa et al. | |
| 2018/0093527 | A1 * | 4/2018 | Iwamura | B60B 5/02 |
| 2018/0326787 | A1 | 11/2018 | Pannikottu et al. | |

FOREIGN PATENT DOCUMENTS

| | | |
|---|---|---|
| JP | H06182471 | 7/1994 |
| JP | 2003211901 A | 7/2003 |
| JP | 2011178308 | 9/2011 |
| JP | 2018058541 | 4/2018 |
| KR | 1020140001048 | 1/2014 |
| WO | 2014188912 | 11/2014 |

OTHER PUBLICATIONS

Translation—Crack Resistance and Impact Resistance of Basalt Fiber Reinforced Concrete in Salt Freeze-Thaw Environment, Version 1, Rui Yongqin et al., pp. 1-3, Northeastern University Press, Nov. 30, 2015.
Crack Resistance and Impact Resistance of Basalt Fiber Reinforced Concrete in Salt Freeze-Thaw Environment, Version 1, Rui Yongqin et al., pp. 1-3, Northeastern University Press, Nov. 30, 2015.

* cited by examiner

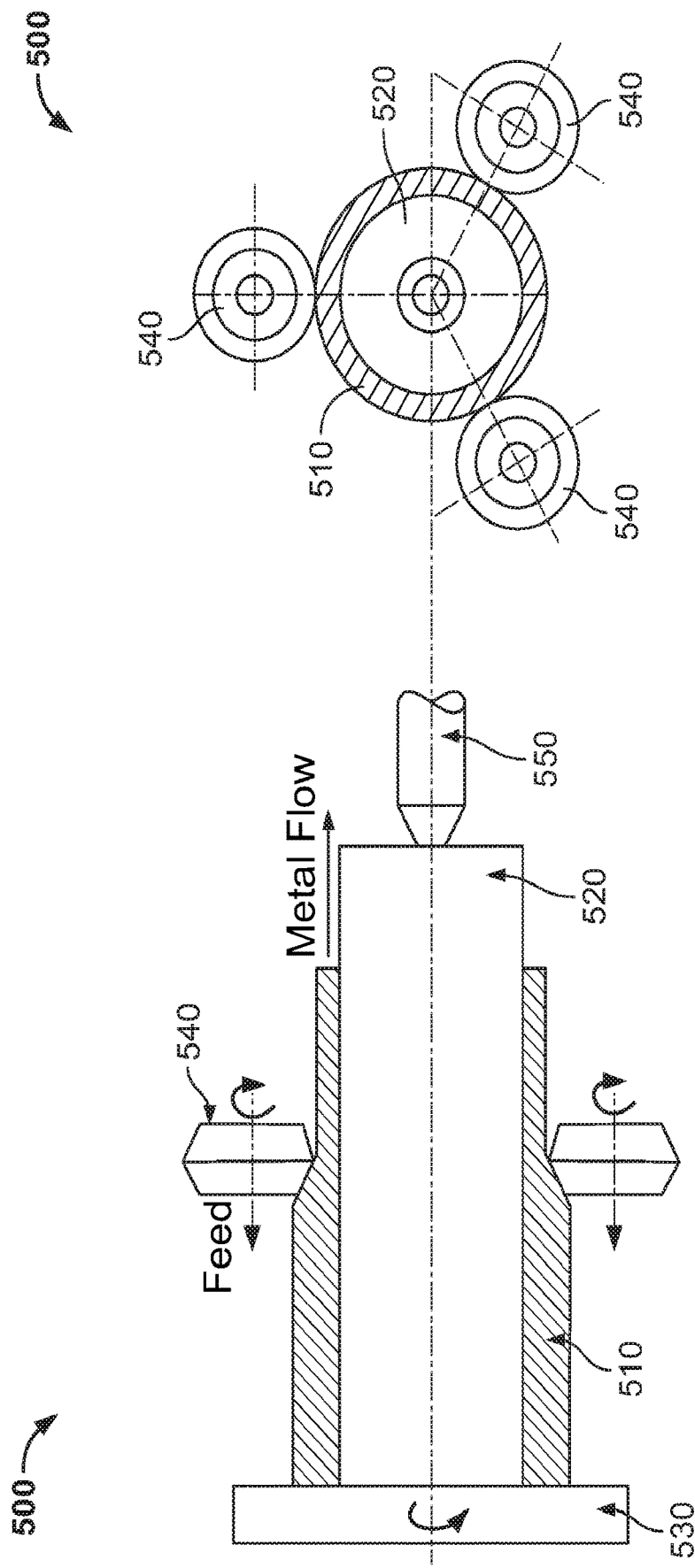

TIRE TREAD WITH A BAND LAYER

FIELD OF INVENTION

The present disclosure relates to a tire tread, and a method of making the same. More particularly, the present disclosure relates to a tire tread with a band layer attached to a tread rubber layer, and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring. In some non-pneumatic tires, a circumferential tread may be wrapped about the outer ring of the tire.

The circumferential tread may contain a shear element having an elastic region disposed between upper and lower inelastic regions. The shear element may also be referred to as a shear band, a tread band, or a thin annular high strength band element. When used in a pneumatic tire, the shear element acts as a tension member when the tire is pressurized. When used in a non-pneumatic tire, or a pneumatic tire in an unpressurized or partially pressurized state, the shear element acts as a structural compression member.

SUMMARY OF THE INVENTION

In one embodiment, a non-pneumatic tire includes an inner ring having an axis of rotation and an outer ring coaxial with the inner ring. The non-pneumatic tire further includes support structure extending from the inner ring to the outer ring and a circumferential tread extending about the outer ring. The circumferential tread includes a band layer constructed of a single material and a tread rubber layer directly attached to the band layer.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 8A is a cross-sectional view of one embodiment of a reverse flow forming system for forming a cylinder;

FIG. 8B is a front view of the reverse flow forming system of FIG. 8A;

DETAILED DESCRIPTION

Figure 1:
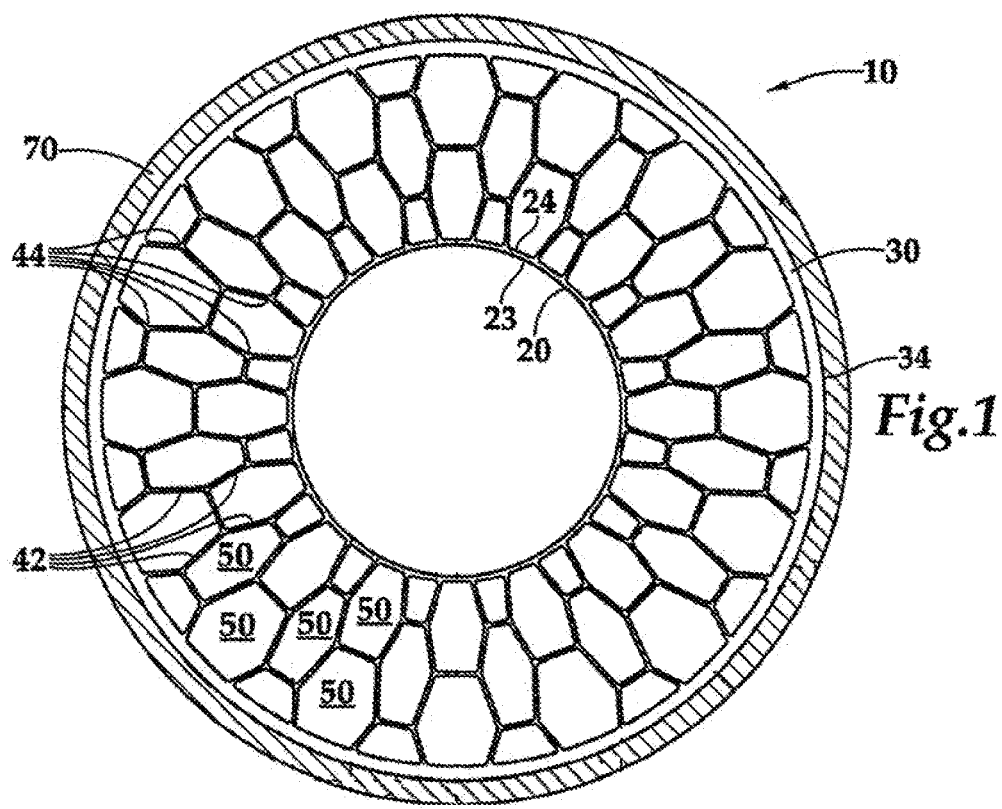
FIG. 1 is a side view of an undeformed non-pneumatic tire.
Figure 2:
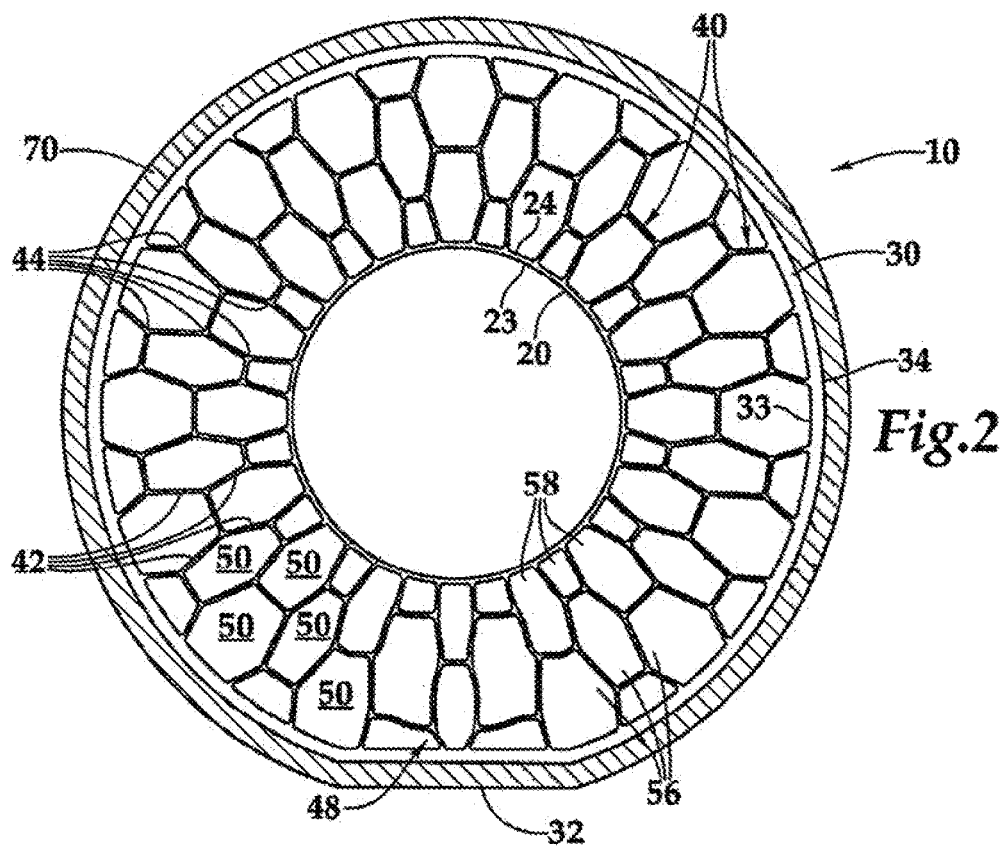
FIG. 2 is a side view of the non-pneumatic tire of FIG. 1 being deformed when subjected to a load.

FIGS. 1 and 2 illustrate one embodiment of a non-pneumatic tire 10.

The non-pneumatic tire 10 is merely an exemplary illustration and is not intended to be limiting. In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of an elastomeric material or metal.

The non-pneumatic tire 10 further includes a generally annular outer ring 30 surrounding an interconnected web 40, which is a support structure connected to the generally annular inner ring 20. In alternative embodiments, a plurality of spokes or other support structure connects the inner ring to the outer ring. The outer ring 30 can be configured to deform in an area 48 around and including a footprint region 32 (see FIG. 2), which decreases vibration and increases ride comfort.

In one embodiment, the generally annular inner ring 20 and the generally annular outer ring 30 are made of the same material as interconnected web 40. In an alternative embodiment, at least one of the generally annular inner ring, the generally annular outer ring, and the interconnected web are made of a different material. As shown in FIG. 1, the generally annular outer ring 30 can have a radially external surface 34 to which a tread carrying layer 70 is attached. Attachment can be done adhesively or using other methods commonly available in the art.

In the illustrated embodiment, the interconnected web 40 has at least two radially adjacent layers 56, 58 of web elements 42 that define a plurality of generally polygonal openings 50 having a plurality of vertices 44. In other embodiments (not shown), other web configurations may be employed. In another embodiment (not shown), spokes or other support structure may be employed instead of a web.

Figure 3:
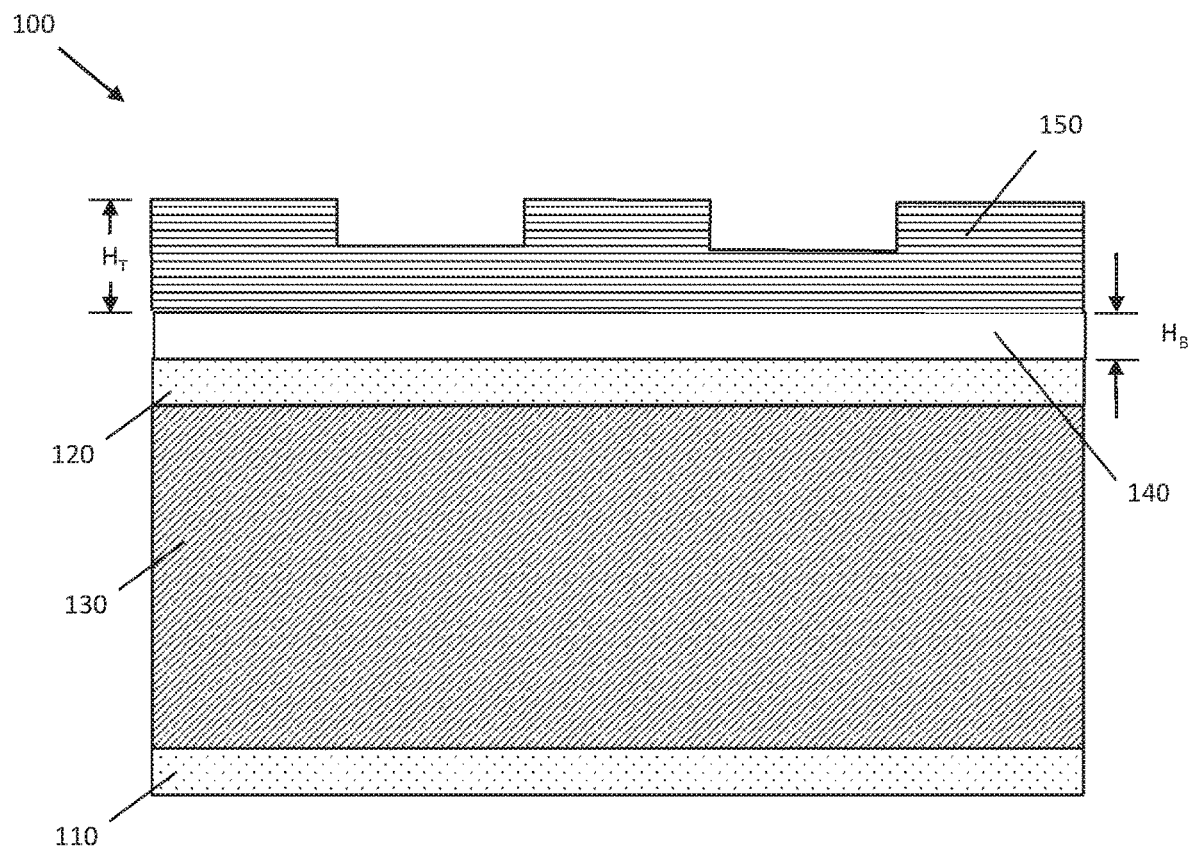
FIG. 3 is a schematic drawing illustrating a partial cross-section of one embodiment of a non-pneumatic tire.

FIG. 3 is a schematic drawing illustrating a partial cross-section of one embodiment of a non-pneumatic tire 100. In this embodiment, the non-pneumatic tire 100 includes a tire structure having an inner ring 110, an outer ring 120, and a support structure 130 extending from the inner ring to the outer ring. In one embodiment, the support structure 130 is a webbing, such as the webbing shown in FIGS. 1 and 2. In an alternative embodiment, the support structure includes a plurality of spokes. It should be understood, however, that any support structure may be employed.

The non-pneumatic tire 100 includes a circumferential tread having the same width as the outer ring 120. The circumferential tread includes a band layer 140 constructed of a single material. A tread rubber layer 150 is directly attached to the band layer 140.

The illustrated structure carries an applied load by resisting bending about its neutral axis. Bending of the band layer 140 assists in carrying a load on the non-pneumatic tire 100. If metal or other lossless materials are used for the band layer 140, rolling resistance and heat generation of the assembly can be reduced. This is a departure from prior polymeric shear layers having plies of steel cords. Such polymeric shear layers provide load carrying capability, at the expense of high rolling resistance and heat generation.

The single material of the band layer 140 may be a composite, or blend of multiple materials, but the band layer 140 is not formed of distinct layers of materials. In one embodiment, the band layer 140 is constructed of steel. In one specific embodiment, the band layer 140 is constructed of ultra high strength steel. Other exemplary materials include, without limitation, rubber, other metals such as aluminum, brass, copper, and stainless steel, or polymeric materials including polyurethane, polyester, and polyvinyl chloride (PVC).

Favorable performance may be achieved with a band layer constructed of a material having a high ultimate tensile strength and a surface finish with low surface roughness. In one embodiment, the band layer is constructed of a material having an ultimate tensile strength of at least 60,000 pounds of force per square inch (i.e., 60 ksi or 410 MPa). In another embodiment, the band layer is constructed of a material having an ultimate tensile strength of at least 120,000 pounds of force per square inch (i.e., 120 ksi or 830 MPa). In yet another embodiment, the band layer is constructed of a material having an ultimate tensile strength of at least 200,000 pounds of force per square inch (i.e., 200 ksi or 1400 MPa). A band layer constructed of a material having a high ultimate tensile strength has a better fatigue life.

Additionally, in one embodiment, the band layer is constructed of a material having an average surface roughness of less than 1000 micro inches (i.e., 25 microns). In another embodiment, the band layer is constructed of a material having an average surface roughness of less than 64 micro inches (i.e., 1.6 microns). In yet another embodiment, the band layer is constructed of a material having an average surface roughness of less than 32 micro inches (i.e., 0.8 microns). While a rougher finish may be better for adhesion, it has been found that a finer finish is better for fatigue life.

The ultimate tensile strengths and average surface roughnesses identified above may be found in high strength steel that has been prepared through a shot peening or laser shock peening process. The high strength steel may be specialty steel and may receive special heat treatment. Aluminum and titanium may also exhibit the ultimate tensile strengths and average surface roughnesses identified above.

Figure 4:
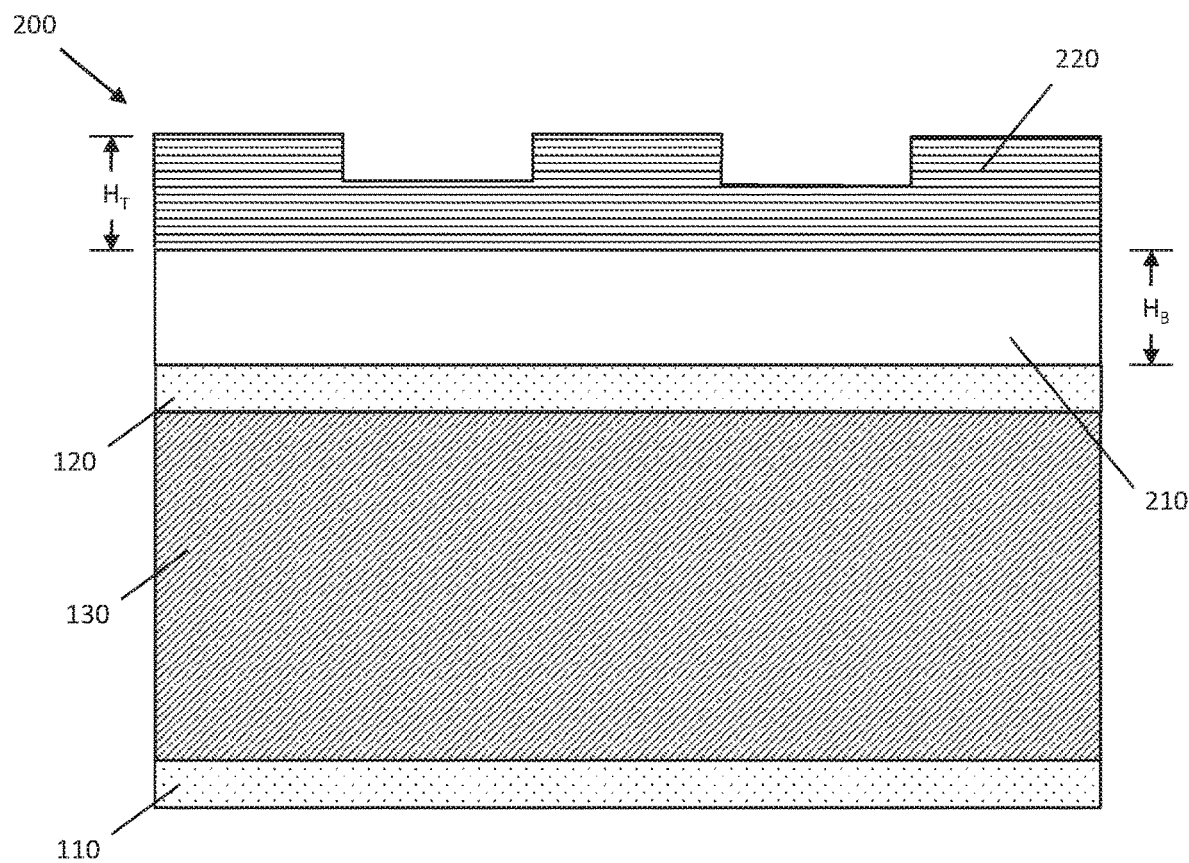
FIG. 4 is a schematic drawing illustrating a partial cross-section of an alternative embodiment of a non-pneumatic tire.

In the illustrated embodiment, the band layer 140 has a band height (i.e., a band thickness) $H_B$, and the tread rubber layer 150 has a tread height (i.e., a tread thickness) $H_T$ that is greater than the band height $H_B$. In one known embodiment, the band height is between 0.010 inches and 0.300 inches (0.254 mm to 7.62 mm). However, other arrangements may be employed. FIG. 4 is a schematic drawing illustrating a partial cross-section of an alternative embodiment of a non-pneumatic tire 200. The non-pneumatic tire 200 is substantially the same as the non-pneumatic tire 100 described herein, except for the differences noted below. Like reference numerals are used for like elements.

In this embodiment, the circumferential tread includes a band layer 210 and a tread rubber layer 220. Here the band layer 210 has a band height $H_B$, and the tread rubber layer 220 has a tread height $H_T$ that is equal to the band height $H_B$.

Figure 5:
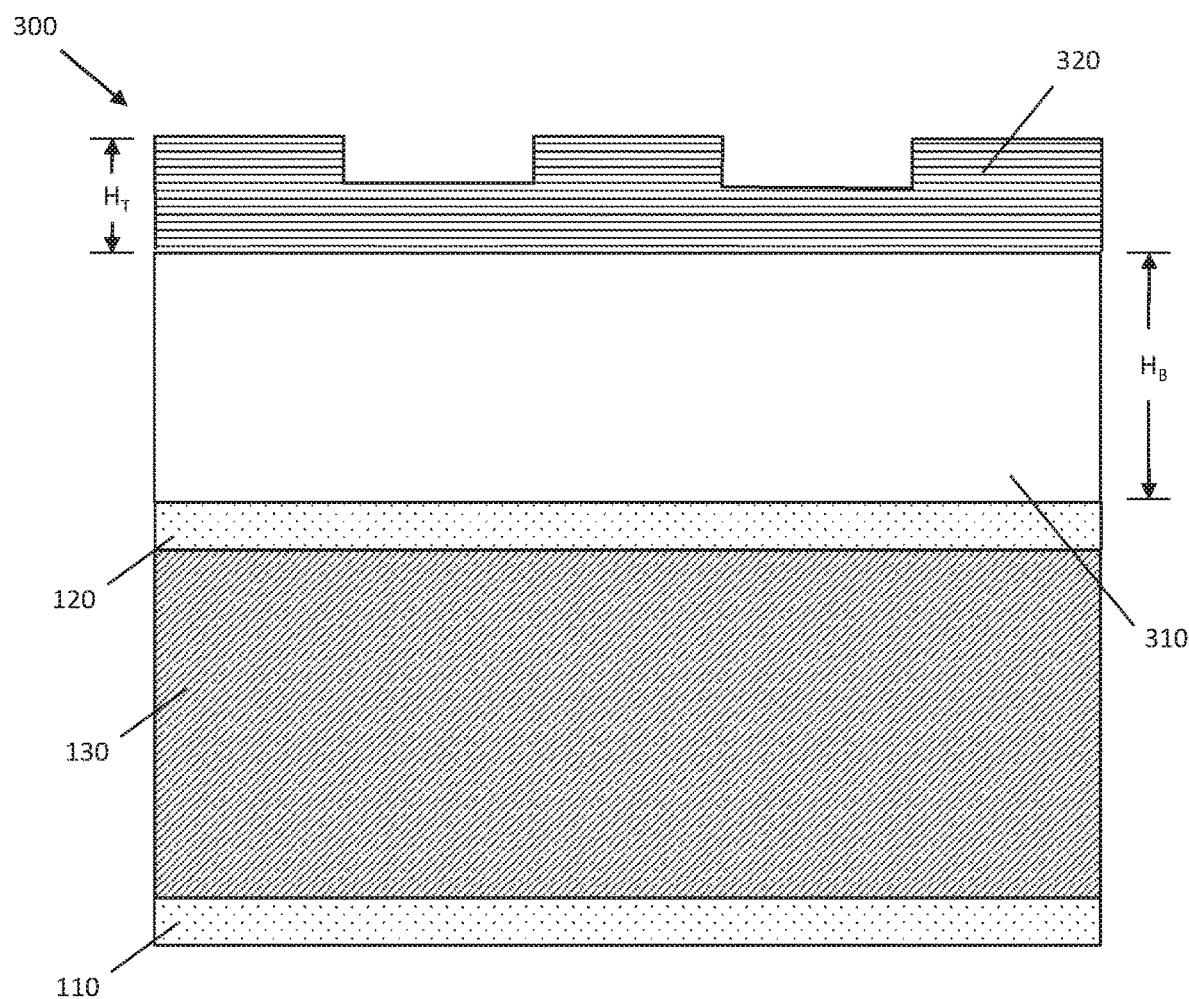
FIG. 5 is a schematic drawing illustrating a partial cross-section of another alternative embodiment of a non-pneumatic tire.

FIG. 5 is a schematic drawing illustrating a partial cross-section of another alternative embodiment of a non-pneumatic tire 300. The non-pneumatic tire 300 is substantially the same as the non-pneumatic tires 100, 200 described herein, except for the differences noted below. Like reference numerals are used for like elements.

In this embodiment, the circumferential tread includes a band layer 310 and a tread rubber layer 320. Here the band layer 310 has a band height $H_B$, and the tread rubber layer 320 has a tread height $H_T$ that is less than the band height $H_B$.

Figure 6:
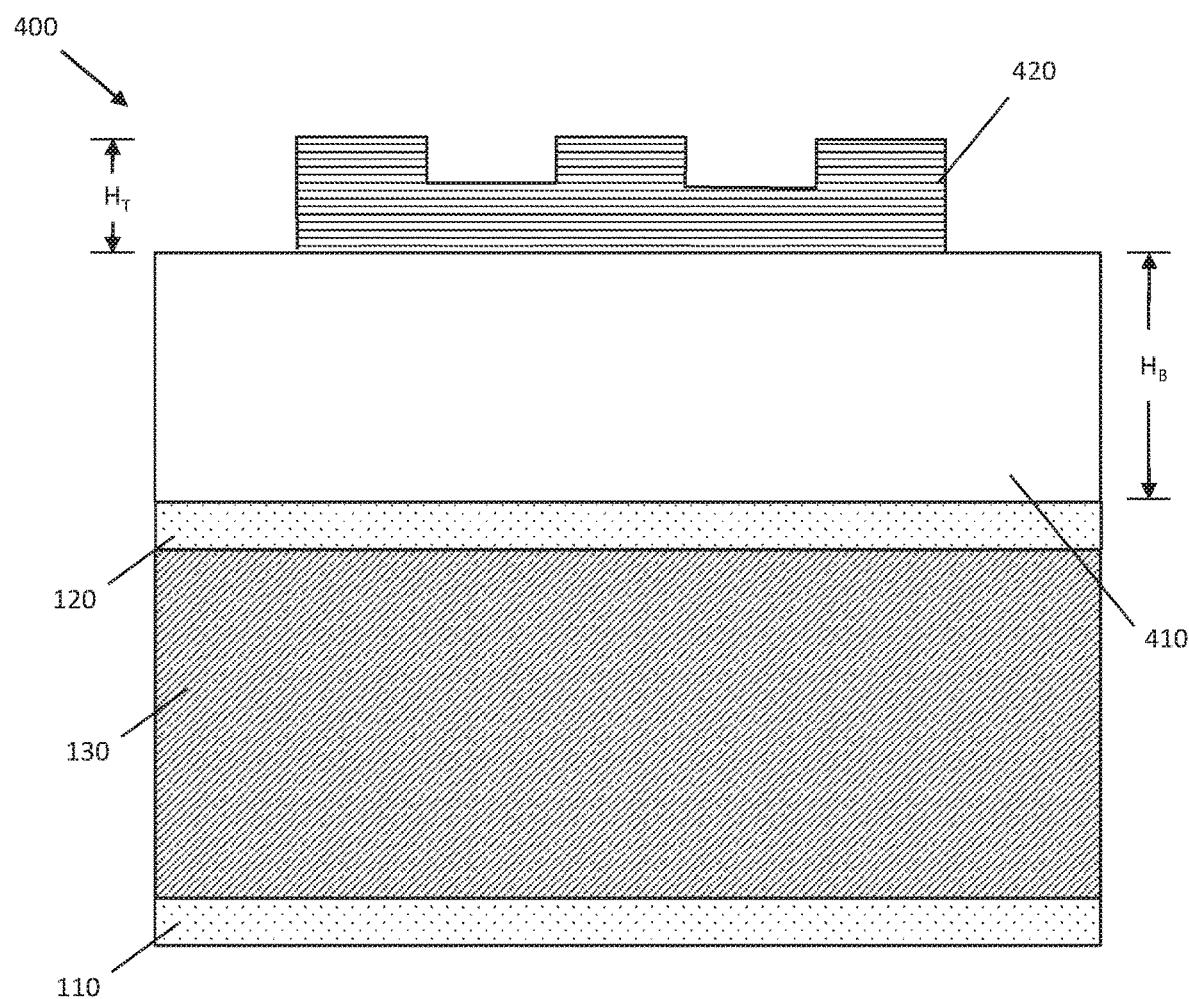
FIG. 6 is a schematic drawing illustrating a partial cross-section of yet another alternative embodiment of a non-pneumatic tire.

FIG. 6 is a schematic drawing illustrating a partial cross-section of yet another alternative embodiment of a non-pneumatic tire 400. The non-pneumatic tire 400 is substantially the same as the non-pneumatic tires 100, 200, 300 described herein, except for the differences noted below. Like reference numerals are used for like elements.

In this embodiment, the circumferential tread includes a band layer 410 and a tread rubber layer 420. Here the band layer 310 has a band height $H_B$, and the tread rubber layer 320 has a tread height $H_T$ that is less than the band height $H_B$, similar to the tire 300. In this embodiment, the tread rubber layer 420 also has a width that is less than the width of the band layer 410.

In another alternative embodiment (not shown), the tread rubber layer has a width less than the width of the band layer, and a height equal to the height of the band layer. In yet another alternative embodiment (not shown), the tread rubber layer has a width less than the width of the band layer, and a height greater than the height of the band layer.

Figure 7:
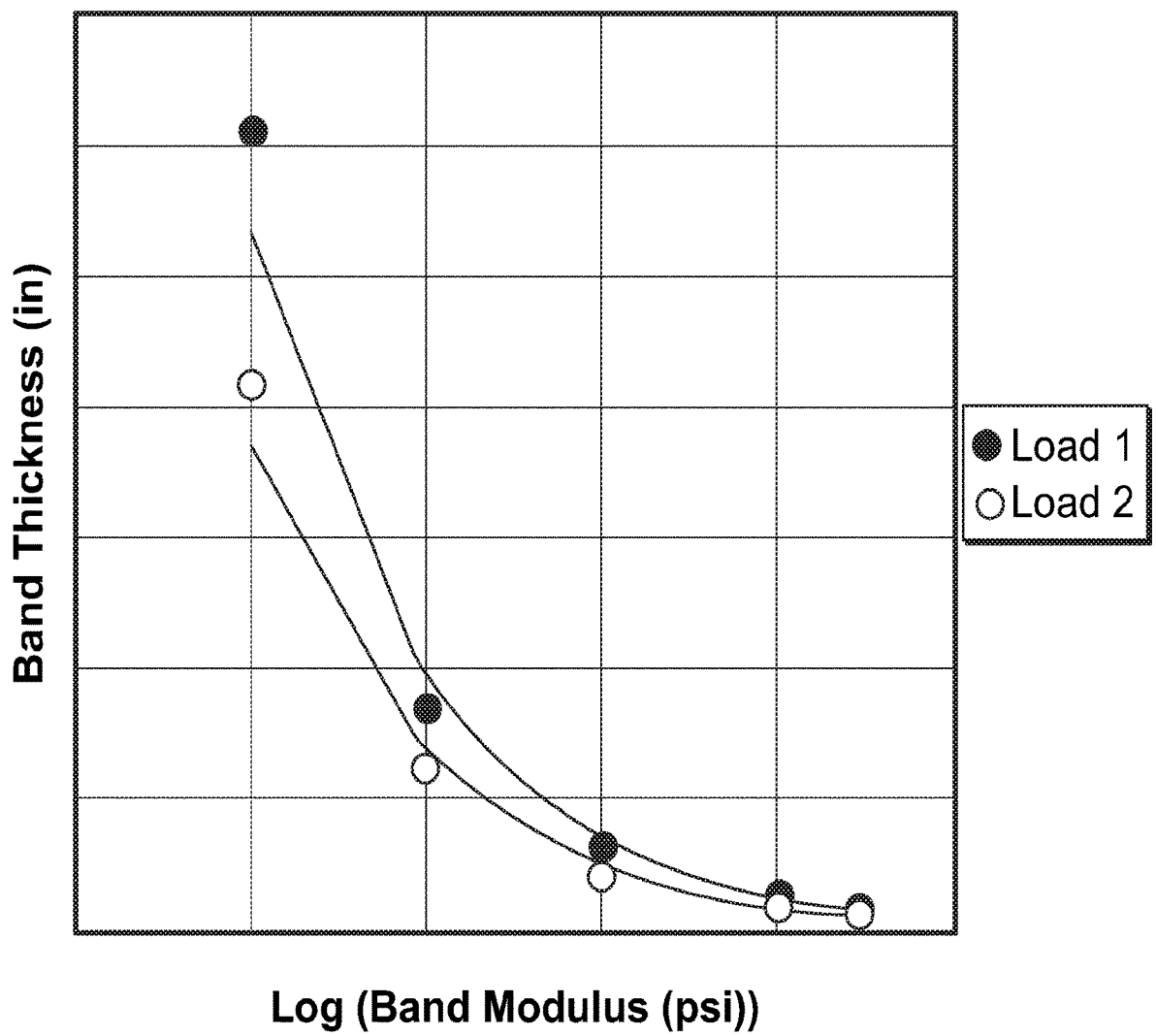
FIG. 7 is a graph illustrating a band layer thickness versus a band layer modulus.

The heights of the band layer and the tread layer may be selected to provide desirable performance of the non-pneumatic tire. For example, it may be desirable to balance the bending stiffness of the band layer with the thickness of the band layer to regulate a bending moment about the neutral axis to carry a desired load at a desired deflection. As shown in FIG. 7, a relationship can be established between the thickness of the band layer and the modulus of the band layer needed to support a specific load at a specific vertical deflection.

Selecting the heights of the band layer and the tread rubber layer also allows the tire designer to select the location of a neutral axis of the circumferential tread. For example, the neutral axis location may be selected such that the circumferential tread would have different bending stiffness in different directions. If the neutral axis is closer to an outer diameter of the tire, the lead and trailing edge of the footprint will be harder to bend, thus increasing load carrying capacity. However, if the tire rolls over an object, it would have a lower bending stiffness in that direction thus allowing for easier envelopment and a more comfortable ride.

In selecting the materials and heights of each layer, other factors may be considered. For example, it may be desirable to reduce the band layer thickness to reduce volume and weight, as well as the amount of heat generated during rotation of the tire. It may also be desirable, however, to increase band layer thickness to reduce stress in the band layer.

Additionally, it may be desirable to select the thickness and stiffness of the tread rubber layer and the band layer to regulate footprint length.

It has been found that a band in the form of a seamless, metal cylinder yields good results. Such cylinders may have a diameter between 20-50 inches (50-130 cm). In more specific embodiments, the cylinder has a diameter between 30-40 inches (75-100 cm). In one specific embodiment, the cylinder has a diameter of 36 inches (91 cm).

As noted above, the cylinder thickness may be between 0.010 inches and 0.300 inches (0.254 mm to 7.62 mm). In more specific embodiments, the cylinder thickness is between 0.020 inches and 0.150 inches (0.50 mm to 3.8 mm). In one specific embodiment, the cylinder thickness is 0.145 inches (3.68 mm).

As noted above, the seamless cylinder may be made of steel. Exemplary steel includes ultra high strength steel, 4340 steel, or 1080 steel. Alternatively, the seamless cylinder may be formed of an alloy.

In one embodiment, the seamless cylinder is made by a rough forging process, which may produce a cylinder with a desired diameter. However, it is difficult to forge a cylinder having a diameter between 20-50 inches and a thickness between 0.010 inches and 0.300 inches. Forging a cylinder with such dimensions may result in cracks, micro-cracks, or other irregularities.

Therefore, in an alternative embodiment, a seamless cylinder with a diameter between 20-50 inches and a thickness between 0.300 inches to 1 inch is made by a rough forging process. The cylinder is then machined or lathed to a desired thickness of between 0.010 inches and 0.300 inches. The machining or lathing may be performed in multiple steps. The cylinder may also be subjected to heat treatment steps and polishing steps. Such a process may be time intensive, and may produce undesirable waste.

In another alternative embodiment, a seamless cylinder with a diameter between 20-50 inches and a thickness between 0.300 inches to 1 inch is made by a rough forging process. The thickness of the cylinder is then reduced by a cold forming process. Exemplary cold forming processes include deep drawing, closed die-forging, metal spinning, and flow forming (including reverse flow forming). In one specific embodiment, a seamless cylinder with a diameter of 36 inches and a thickness of 0.5 inches is formed by a rough forging process and then the thickness is reduced to between 0.010 inches to 0.300 inches by a cold forming process.

The cold forming process both reduces the thickness and increases the length of the cylinder. Thus, in one embodiment, a cylinder is rough forged with a length that is shorter than desired, and the cold forming process elongates the cylinder to a desired length. In another embodiment, the cold forming process elongates the cylinder to a greater than desired length. In such an embodiment, the cold formed cylinder may be cut into two or more cylinders.

The cold forming process also increases the hardness of the cylinder. In one known embodiment, a steel cylinder has a hardness of 45-60 on the Rockwell C scale after a cold forming process. Alternatively, the steel cylinder may have a hardness of less than 45 of the Rockwell C scale after a cold forming process. Likewise, the steel cylinder may have a hardness of greater than 45 of the Rockwell C scale after a cold forming process.

A seamless cylinder may be formed by a rough forging and cold forming process without performing a heat treatment. In other embodiments, however, a heat treatment may still be performed. In one specific embodiment, a specialized heat treatment process known as vacuum inert gas quench hardening is employed. This process achieves the same properties as a standard furnace heat treatment followed by an oil, water, or ethylene glycol quench but has the distinct benefit of preventing oxidation to the steel during the process. Steps of stress relieving, hardening, and tempering may be performed fully under vacuum to prevent oxidation to the steel. Because there is little to no oxidation during such a heat treatment process, additional processing such as grinding or polishing may be omitted.

The cold forming process also smooths the outer surface of the cylinder. Thus, a seamless cylinder may be formed by a rough forging and cold forming process without polishing the cylinder. In other embodiments, a polishing step may still be performed.

In one embodiment, the cold forming process is a reverse flow forming process, as illustrated in FIGS. 8A,B. FIG. 8A illustrates a cross-sectional view of a reverse flow forming system 500, while FIG. 8B illustrates a front view of the reverse flow forming system 500. In this system, a seamless cylinder 510 is placed on a mandrel 520 having a spindle 530. The seamless cylinder 510 is open ended and may be referred to as a preform. The seamless cylinder 510 may be constructed of one of the materials identified above and may be formed by a rough forging process.

After the seamless cylinder 510 is placed on the mandrel 520, the spindle 530 rotates the mandrel 520 and the seamless cylinder 510 in a first direction. A plurality of rollers 540 engage the seamless cylinder 510 and the rollers 540 rotate in a second direction opposite the first direction. A tailstock 550 provides support for the system.

The rollers 540 then move towards the spindle, reducing the thickness of the seamless cylinder 510, and causing the material of the cylinder to move in a direction opposite to the travel direction of the rollers 540. In the illustrated embodiment, three cylinders are employed. In alternative embodiments, any number of rollers may be employed.

In one embodiment, the rollers 540 are spaced from the mandrel 520 by a distance equal to the desired thickness of the finished cylinder. Thus, in such an embodiment, the thickness of the cylinder 510 is reduced to the desired thickness by a single pass of the rollers 540. In an alternative embodiment, the rollers 540 are first spaced by a distance greater than the desired thickness of the finished cylinder. In such an embodiment, after a first pass of the rollers 540, the rollers 540 are returned to an axial starting position and the distance between the rollers 540 and the mandrel 520 is reduced. A second pass of the rollers is then performed. If the thickness of the cylinder is still greater than desired, the process can be repeated for as many passes as desired.

In all embodiments, the rollers 540 may be staggered both axially and radially.

Figure 9A:
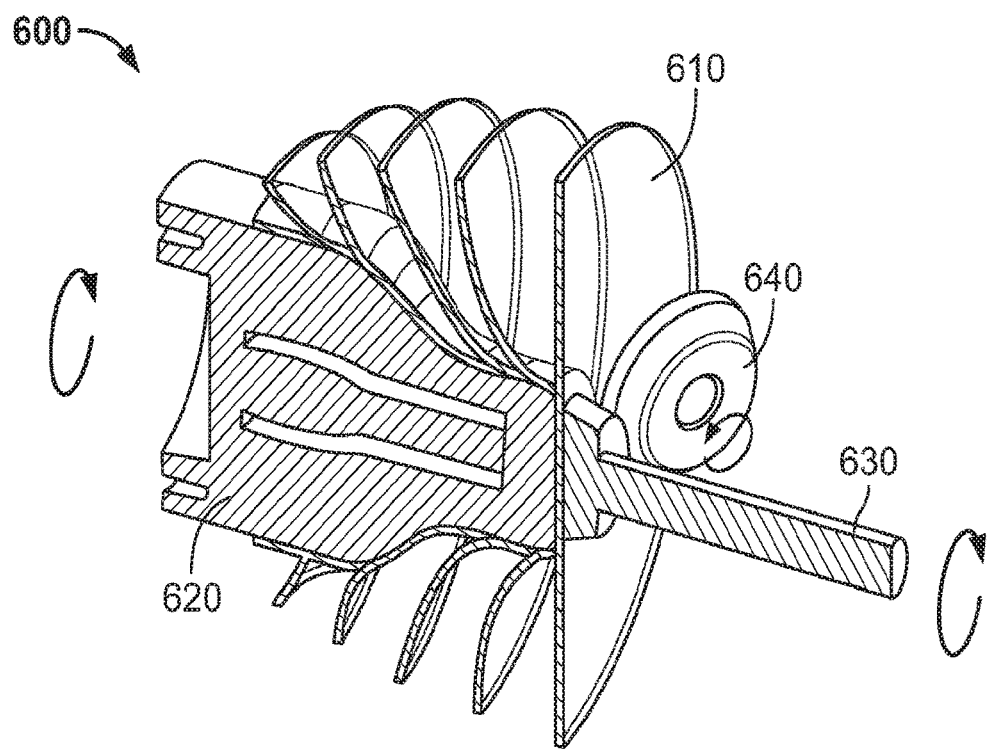
FIG. 9A is a perspective view of one embodiment of a metal spinning system showing a metal plate in various stages of deformation.
Figure 9B:
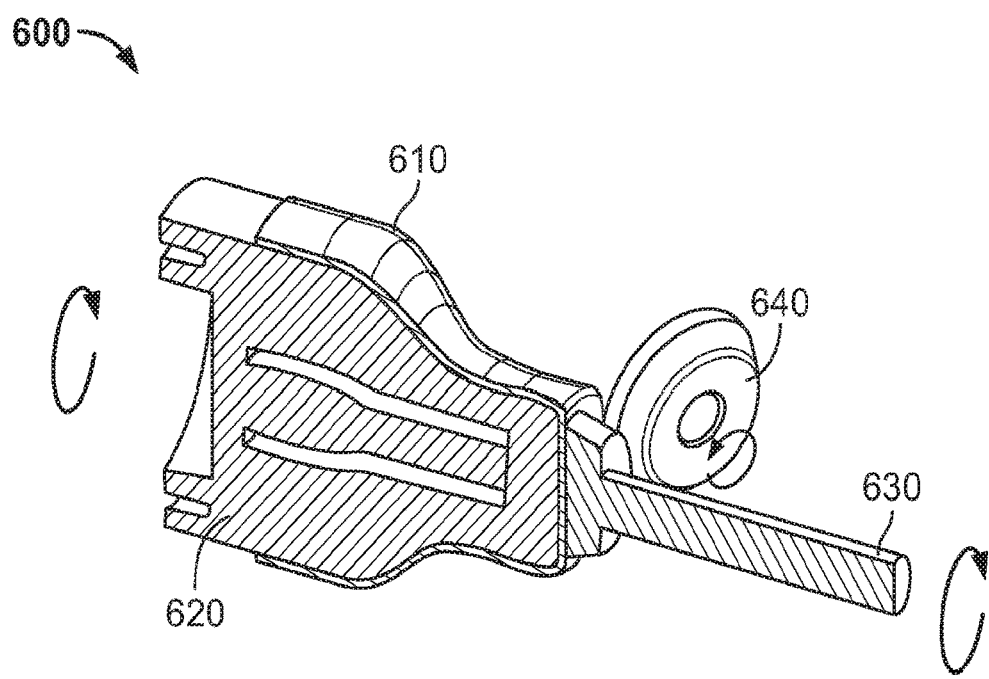
FIG. 9B is a perspective view of the metal spinning system of FIG. 9A showing the metal plate in a final form.

In an alternative embodiment, the seamless cylinder is formed by a metal spinning process. FIG. 9A illustrates a perspective view of a metal spinning system 600 showing a metal plate 610 in various stages of deformation. FIG. 9B illustrates a perspective view of the metal spinning system 600 showing the metal plate in a final form.

In the illustrated embodiment, the plate 610 is placed against a mandrel 620 and held in place by a tail stock 630. The mandrel 620 and tail stock 630 then rotate in a first direction, causing the plate 610 to rotate in the same direction. A roller 640 then engages the plate 610 and rotates in a second direction opposite the first direction. The roller 640 than moves away from the tail stock 630 causing the plate 610 to deform as shown in FIG. 9A and take the shape of the mandrel 620.

After the roller 640 completes its pass, the deformed plate 610 has a closed shape having a cylindrical end. The cylindrical end of the deformed plate 610 can then be cut or otherwise separated.

In one embodiment, the circumferential tread is preformed by first assembling the band layer and the tread rubber layer. The circumferential tread is then attached to the outer ring 120 with an adhesive, by welding or brazing, or by a chemical bond, such as by heating the components to create a bond.

In an alternative embodiment, the circumferential tread may be built layer by layer onto the outer ring 120. The building process would include placing the band layer about the outer ring 120, and then placing the tread rubber layer about the band layer. In one embodiment, the layers are attached to each other at each step, such as with an adhesive, by welding or brazing, or by a chemical bond, such as by heating the components to create a bond. In an alternative embodiment, the tire is heated after all of the layers are assembled, such that the layers bond to each other.

While the band layer and tread rubber layer have been described with respect to non-pneumatic tires, it should be understood that they may also be employed in pneumatic tires, such as run-flat pneumatic tires.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
an inner ring having an axis of rotation;
an outer ring coaxial with the inner ring;
support structure extending from the inner ring to the outer ring; and
a circumferential tread extending about the outer ring, the circumferential tread including a seamless cylinder constructed of a solid, metallic material extending across a width of the tread and a tread rubber layer directly attached to the seamless cylinder, wherein the seamless cylinder has a diameter between 20-50 inches and a thickness between 0.010 inches and 0.300 inches.

2. The non-pneumatic tire of claim 1, wherein the seamless cylinder is directly attached to the outer ring.

3. The non-pneumatic tire of claim 1, wherein the solid, metallic material of the seamless cylinder is steel.

4. The non-pneumatic tire of claim 1, wherein the solid, metallic material has an ultimate tensile strength of at least 410 MPa.

5. The non-pneumatic tire of claim 1, wherein the solid, metallic material has an ultimate tensile strength of at least 830 MPa.

6. The non-pneumatic tire of claim 1, wherein the solid, metallic material has an ultimate tensile strength of at least 1400 MPa.

7. The non-pneumatic tire of claim 1, wherein the solid, metallic material has a surface with an average surface roughness of less than 25 microns.

8. The non-pneumatic tire of claim 1, wherein the solid, metallic material has a surface with an average surface roughness of less than 1.6 microns.

9. The non-pneumatic tire of claim 1, wherein the solid, metallic material has a surface with an average surface roughness of less than 0.8 microns.

10. A method of making a non-pneumatic tire, the method comprising:
providing an assembly with an inner ring, an outer ring coaxial with the inner ring, and support structure extending from the inner ring to the outer ring;
providing a seamless cylinder about the outer ring, the seamless cylinder being constructed of a solid, metallic material extending across a width of the tire, wherein the seamless cylinder has a diameter between 20-50 inches and a thickness between 0.010 inches and 0.300 inches; and
providing tread rubber about the seamless cylinder.

11. The method of claim 10, wherein the providing of the seamless cylinder includes rough forging a seamless cylinder, then cold forming the seamless cylinder to thin a wall of the seamless cylinder.

12. The method of claim 11, wherein the cold forming of the seamless cylinder includes reverse flow forming the seamless cylinder.

13. The method of claim 10, wherein the providing of the seamless cylinder includes providing a plate and metal spinning the plate to form the seamless cylinder.

14. The method of claim 10, further comprising heat treating the seamless cylinder.

15. A non-pneumatic tire comprising:
an inner ring having an axis of rotation;
an outer ring coaxial with the inner ring;
support structure extending from the inner ring to the outer ring; and
a circumferential tread extending about the outer ring, the circumferential tread including a seamless cylinder constructed of a solid, metallic material extending across a width of the tread, wherein the seamless cylinder has a diameter between 20-50 inches and a thickness between 0.010 inches and 0.300 inches, and wherein the seamless cylinder has a surface with an average surface roughness of less than 25 microns.

16. The non-pneumatic tire of claim 15, wherein the seamless cylinder is directly attached to the outer ring.

17. The non-pneumatic tire of claim 15, wherein the solid metallic material of the seamless cylinder is steel.

18. The non-pneumatic tire of claim 15, wherein the solid metallic material has an ultimate tensile strength of at least 410 MPa.

19. The non-pneumatic tire of claim 15, wherein the solid metallic material has an ultimate tensile strength of at least 1400 MPa.

* * * * *